(12) United States Patent
Lobo (10) Patent No.: US 7,613,704 B2
(45) Date of Patent: Nov. 3, 2009

(54) ENTERPRISE DIGITAL ASSET MANAGEMENT SYSTEM AND METHOD

(75) Inventor: Sanjay P. Lobo, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 11/039,389

(22) Filed: Jan. 19, 2005

(65) Prior Publication Data

US 2006/0161604 A1 Jul. 20, 2006

(51) Int. Cl.
G06F 17/30 (2006.01)

(52) U.S. Cl. ............... 707/10; 707/1; 707/3; 707/9; 709/220; 709/226

(58) Field of Classification Search .......... 707/10, 707/1, 3, 9; 709/226, 220
See application file for complete search history.

(56) References Cited

U.S. PATENT DOCUMENTS

| | | | | | |
|---|---|---|---|---|---|
| 5,832,499 | A | * | 11/1998 | Gustman | 707/103 R |
| 5,884,046 | A | * | 3/1999 | Antonov | 709/238 |
| 7,096,484 | B2 | * | 8/2006 | Mao et al. | 725/52 |
| 7,143,179 | B2 | * | 11/2006 | Yaport et al. | 709/231 |
| 2002/0073177 | A1 | * | 6/2002 | Clark et al. | 709/219 |
| 2002/0133491 | A1 | * | 9/2002 | Sim et al. | 707/10 |
| 2005/0273662 | A1 | * | 12/2005 | Yi | 714/31 |
| 2006/0031285 | A1 | * | 2/2006 | Ruhnke et al. | 709/203 |

OTHER PUBLICATIONS

PCT Notification of Invitation to Pay Additional Fees, for International Application No. PCT/US2006/001550, 6 pages, Jun. 14, 2006.
Kubiatowicz et al.; OnceanStore: An Architecture for Global-Scale Persistent Storage; XP-002993765; 12 pages, 2000.
Turrini et al.; Using P2P Techniques for Content Distribution Internetworking: A Research Proposal; XP-010612203; 2 pages, Sep. 05, 2002.
Notification Concerning Transmittal of Copy of International Preliminary Report on Patentability, and International Preliminary Report on Patentability (Chapter 1 of the Patent Cooperation Treaty), and Written Opinion of the International Searching Authority; International Application No. PCT/US2006/001550; (9 pages), mailed Aug. 2, 2007.

* cited by examiner

*Primary Examiner*—Isaac M Woo
*Assistant Examiner*—Syling Yen (57) ABSTRACT

According to one embodiment of the invention, a method of providing digital content includes receiving a request from a user for digital content at a remote site. A first digital library at the remote site is searched for the digital content. If the digital content is unavailable at the remote site, a second digital library located at another site is searched for the digital content. If the content is available at the other site, a request for transfer of the digital content from the other site to the remote site is made. The digital content is received at the remote site from the other site and transferred to the user from the remote site. The digital content is temporarily stored at the remote site such that the content may be accessed by other users.

25 Claims, 5 Drawing Sheets

ENTERPRISE DIGITAL ASSET MANAGEMENT SYSTEM AND METHOD

TECHNICAL FIELD OF THE INVENTION

This invention relates in general to digital content and, more particularly, to an enterprise digital asset management system and method.

BACKGROUND OF THE INVENTION

The digitization of content has vastly facilitated the ability to communicate content from one location to another. For example, digital documents, digital video, digital images, and digital audio can rapidly be sent over a variety of communication mediums. Further, because the content is digital, copying of the digital content can produce high quality copies. With the myriad of benefits of digital content, concerns may arise in the management, distribution, and storage of such digital content.

SUMMARY OF THE INVENTION

According to one embodiment of the invention, a method of providing digital content includes receiving a request from a user for digital content at a remote site. A first digital library at the remote site is searched for the digital content. If the digital content is unavailable at the remote site, a second digital library located at another site is searched for the digital content. If the content is available at the other site, a request for transfer of the digital content from the other site to the remote site is made. The digital content is received at the remote site from the other site and transferred to the user from the remote site. The digital content is temporarily stored at the remote site such that the content may be accessed by other users.

Certain embodiments of the present invention may provide various technical advantages. For example, a technical advantage of one embodiment may include the capability to efficiently manage digital content amongst a variety of users. Other technical advantages of other embodiments may include the capability to distribute digital content from a central site system to remote sites.

While specific advantages have been enumerated above, various embodiments may include all, some, or none of the enumerated advantages. Additionally, other technical advantages may become readily apparent to one of ordinary skill in the art after review of the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

It should be understood at the outset that although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Figure 1:
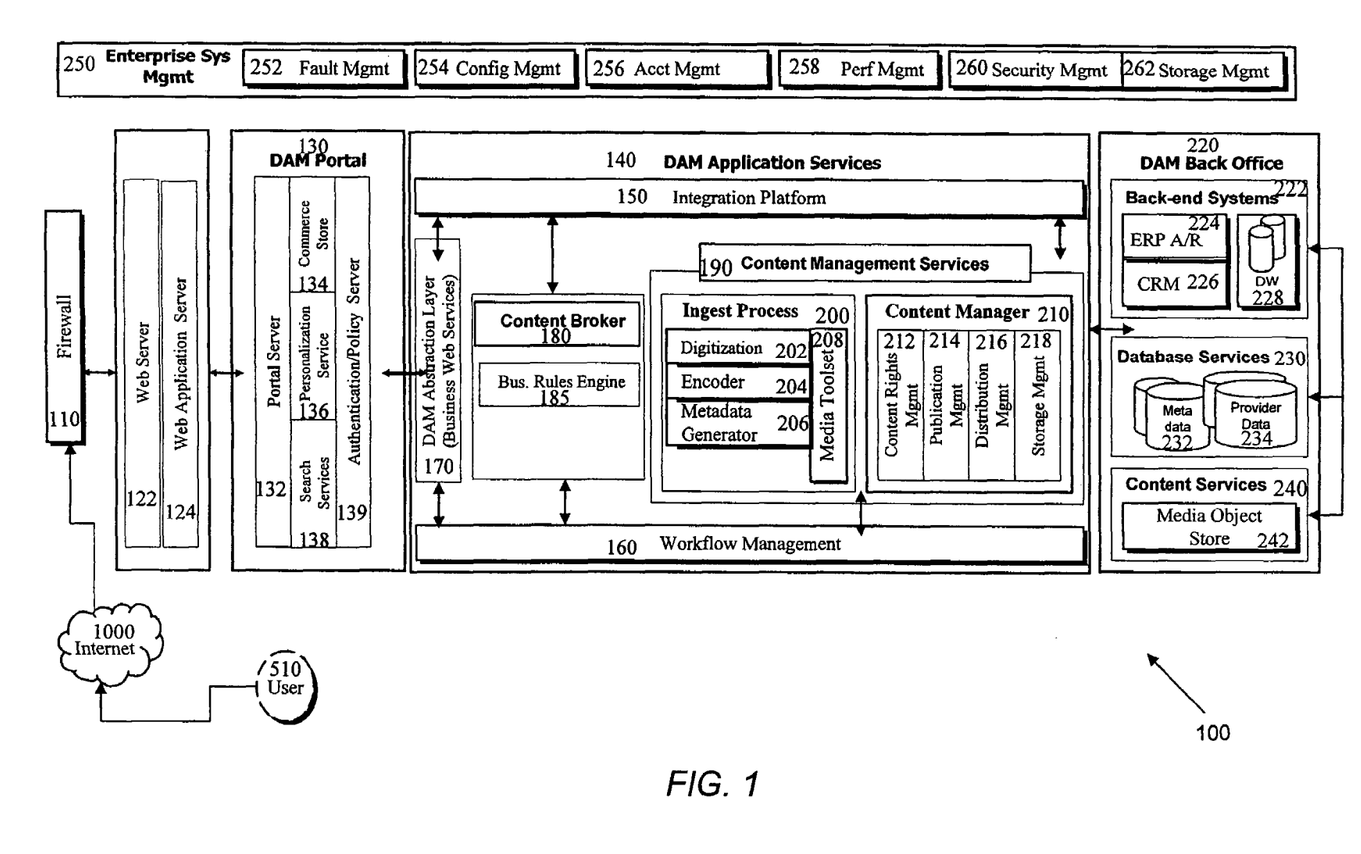
FIG. 1 is an example architecture of a central site system that can be utilized, according to an embodiment of the invention.

FIG. 1 is an example architecture of a central site system 100 that may be utilized, according to an embodiment of the invention. The central site system 100 in the embodiment of FIG. 1 generally includes a digital asset management (DAM) portal module 130, a DAM application services module 140, a DAM back office module 220, and an enterprise system management module 250. While specific component parts and modules of the embodiment of the central site system 100 will be described below, other embodiments of the central site system 100 may utilize more, less, or alternative components parts and modules. Accordingly, the architectural configuration of the central site system 100 may be varied significantly, or alternatively substituted with any suitable component parts and modules.

In some embodiments of the invention, the central site system 100 is designed to operate as a platform that provides a variety of operations pertaining to digital content. The digital content may include, but is not limited to, audio, video, documents, programs, data, files, images, and any other items, capable of being placed in a digital format. The operations with respect to such digital content may include, but are not limited to, uploading, retrieving, digitization, encoding, hosting, publishing, searching, subscription management, content cataloging, and billing.

Example uses of the central site system 100 include, but are not limited to, an organization and/or entity (individuals, news organizations, film studios, universities, corporations, and other businesses) sharing and/or selling and/or buying digital content with/to other authorized individuals either internal or external to the organization and/or entity.

As used herein, "user" may generally refer to a person, entity, object or device, capable of using the central site system 100. For example, a user 510 may be a person, accessing the central site system 100 through a computer. Alternatively, the user 510 may be the computer, itself, programmed to access the central system 100 automatically.

As an illustrative example, the user 510 may access the central site system 100 through the Internet 1000, a firewall 110, and a website hosted by a web server 122. Further details of example technologies that can be utilized in such access will be described below. The user 510 may be a content seeker or a content provider. Content seekers generally seek to access or download digital content from the central site system 100 while content providers generally seek to ingest or upload digital content to the central site system 100. Although the user 510 has been shown accessing the central site system 100 via the Internet 1000 in the embodiment of FIG. 1, in other embodiments, the user 510 may access the central site system 100 through a variety of other communication links including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

The website hosted by the web server 122 may utilize any of a variety of authentication schemes (or, in some cases omit an authentication scheme). As one example, the website may have a registration process whereby the user 510 establishes a username and password to authenticate or log in to the website. The website may additionally utilize a web application server 124 for any particular application or feature that may need to be served up to website for use by the user 510.

Once the user 510 is logged into the website hosted by the web server 122, the user may access the DAM portal module 130. The DAM portal module 130 in this embodiment includes a portal server 132, a commerce store component 134, a personalization service component 136, a search services component 138, and an authentication/policy server 139. The portal server 132 may serve up a portal interface that provides information to facilitate requests that the user 510 may make of the DAM application service module 140. Further details of such requests are provided below. In serving up this portal interface, the portal server 132 may communicate with the other components of the DAM Portal module 130, namely the commerce store component 134, the personalization service component 136, the search services component 138, and the authentication/policy server 139.

The search services component 138 may allow a querying of either the actual content on the central site system 100 or the metadata associated with the actual content on the central site system 100. For example, the user 510 may search the metadata database 232 on a database services component 230—described in more detail below. An example search, utilizing the search services component 138 may be: return all video files of an audio video interleave (AVI) file type created in the last ten days by a particular author. Another search may be: return all video clips that have Michael Jordan, the basketball player, playing against the Dallas Mavericks basketball team. Upon execution of the search, the digital content matching the criteria would be displayed to the user 510. A variety of other search features may be incorporated into the search services component 138, including various search logic and the like. Further, the search services component 138 may utilize any suitable search engine technology.

The personalization services 136 may allow personalization of preferences, prescribed by the user 510. Such preferences may include, for example, the type of interface preferred, the type of content preferred, and the like. An example of personalization may include the user 510 prescribing that the user 510 is interested in digital content related to a particular industry, and, as such, prefers to see digital content related to that particular industry.

The commerce store component 134 may provide a catalog of various digital assets available on the central site system 100. These digital assets may be categorized, according to a variety of parameters, including, but not limited to, type of digital content (e.g., video, document, audio, and picture), digital content size, categories of videos, categories of pictures, video file type (e.g., AVI), audio file type, other parameters, and combinations of the preceding. The search services component 138, personalization services component 136, and commerce store component 134 may also incorporate a variety of collaborative filtering techniques, recognized by those of ordinary skill in the art.

The authentication/policy server 139 may be associated with the registration process in the web server 122 and may define what a particular user 510 is authorized to access. Such authorization, for example, may be based on particular subscription to a service offered by the central site system 100. Alternatively, the authorization may be based on user privileges given to a particular user 510 in an organization.

Although specific examples of information provided to the user 510 through the DAM portal 130 are described above, a variety of other types of information may be provided through the DAM portal 130.

The DAM application service module 140 in this embodiment includes a content management services component 190, an integration platform component 150, a workflow management component 160, a DAM abstraction layer component 170, and a content broker component 180. The DAM application service module 140, may provide for user session management, user access rights, and other content management services, some of which will be described in more detail below. These services may be abstracted and provided to the DAM portal module 130 and ultimately the user 510 through the DAM abstraction layer component 170.

In accessing the DAM application service module 140 through the DAM portal module 130, web server 122, and web application server 124, a variety of different technologies may be utilized including, but not limited to a thin client (via web browser), Java 2 Platform Enterprise Edition (J2EE) based "portlets", .NET based "web parts", and thick clients (via custom .NET or J2EE applications).

The user 510 via the DAM Portal module 130 presents a request to the DAM abstraction layer component 170. The DAM Abstraction layer component 170 contains a set of calling interfaces to each of the components in the DAM Application services module 140. The DAM Abstraction layer component 170 initiates the processing of the request in the DAM application services 140, and at the appropriate time, initiates a response back to the user 510 through the DAM portal module 130. Such processing of the requests by the DAM portal module 140 in this embodiment may be completely transparent to the user 510.

The content broker component 180 may generally facilitate the management of the distribution of the requests of the user 510 to each of the components in the DAM Application services module 140. To assist in this task, the content broker component 180 may contain a business rules engine component 185 that applies a variety of business rules to incoming and outgoing requests. These business rules define further processing that will occur in DAM Application Services module 140. For example, based upon a particular request from the user 510, the business rules engine component 185 upon consulting the applicable business rules may determine that a series of steps need to be undertaken in the DAM application services module 140 to accomplish the request. Examples of business rules may include, but are not limited to, a review of the type of content a particular user may access based upon authorization; a review of the amount of content a user 510 may access based upon a subscription; a review of the amount and/or type of a material that a user 510 may upload to the central site system 100; and a review of the type of formats that digital content should be stored in. Many other business rules may be applied. Other illustrative examples of the utilization of the business rules engine component 185 will be described below.

As part of the management of requests, the content broker component 180 may additionally manage access rights to a particular component based on a profile of the user 510. For example, each of the components in the DAM application services module 140 may require authentication. Accordingly, the content broker component 180 may manage a single sign-on (SSO) for the components the user 510 is authorized to access. The content broker component 180 may also have session management capabilities to allow state awareness of the session of the user 510 to various components.

The workflow management component 160 may generally be utilized to supervise a particular request or task from one component to the next. As an illustrative example, the workflow management component 160 may gather a request from the DAM abstraction layer component 170 and transfer the request to the content broker component 180. The workflow management component 160 may then wait for the content broker component 180 to process the request so that the workflow management component 160 could take the next appropriate step.

The integration platform component 150 may generally facilitate messaging between the various components in the DAM application service module 140. The integration platform component 150 may be any suitable platform service utilized in enterprise integration application systems. A variety of different software vendors provide such integration platforms, including, but not limited to, Tibco Software, Inc.; WebMethods, Inc.; Microsoft Corporation (BizTalk), and SeeBeyond Technology Corporation. In such platforms, a variety of different component adapters may be utilized as will be recognized by those of ordinary skill in the art.

The content management services component 190 may facilitate the management of the content passing through the central site system 100. The content management services component 190 in this embodiment includes an ingest process component 200 and a content manager component 210.

The ingest process component 200 may include a variety of different components, including a digitization component 202, an encoder component 204, a metadata generator component 206, and a media toolset component 208. The digitization component 202 may be utilized to convert, for example, an uploaded picture file to a variety of formats. As an illustrative example, a two megabyte (MB) bit map (BMP) format image may be uploaded to the central site system 100. The business rules, pertaining to storage of this particular digital content may prescribe that the image needs to be digitized to a Joint Photographic Experts Group (JPEG) format for a more economical storage. The business rules engine may additionally prescribe that one or more lower quality JPEG images be created for a thumbnail of the uploaded image. Accordingly, the BMP image may be processed by the digitization component 202 to create a high quality JPEG format image for storage and one or more lower quality JPEG format images for thumbnails. A similar process may additionally be utilized for document conversion.

The encoder component 204 may be utilized for conversion of an audio or video file to a particular format, prescribed in the business rules. For example, a lossless video file may be encoded to a more economical format—e.g., windows media video (WMV). In such encoding, information may be contained within the business rules, indicating that that particular digital content is intended for a specific purpose (e.g., a broadcast) and therefore needs to be encoded at a particular bit rate that would produce high quality video.

With the above digitization component 202 and encoder component 204, it can be seen that in some embodiments the business rules engine component 185 may prescribe that particular digital content be stored in a variety of formats, sizes, and quality.

The metadata generator component 206 gathers information associated with digital content. The gathering process can either be automatic, manual, or a combination of both. As an example of a manual gathering process, the user 510 when uploading digital content to the central site system 100 could be provided a metadata system entry form, served up by the portal server 132. The metadata entry form may allow entry of data such as, but not limited to, author of the content, date, keywords, and the like. In automatic metadata processing, the metadata generator component 206 may include a processing of the digital content to determine the bit rate, size, date, or substance of the digital content. In processing the substance of the digital content, the metadata generator component 206 may recognize a certain color in a picture or recognize spoken words in audio or video files. Automatic metadata extraction of substance of digital content may allow later searches such as: find all video files in which a particular word was spoken.

The media toolset component 208 may generally be a component that facilitates the ingestion processing, coordinating particular software components that may need to be utilized to allow a particular process. For example, the media toolset component 208 may contain all the audio/video codecs and/or algorithms necessary for a particular conversion. Any of a number of digital content formats may be utilized in the central site system 100.

The content manager component 210 in this embodiment, generally includes a content rights management component 212, a publication management component 214, a distribution management component 216, and a storage management component 218. The content rights management component 214 may generally facilitate digital rights management (DRM), associated with digital content. Such digital rights management, may include, for example, processing the digital content, utilizing a variety of techniques and/or technology to limit unauthorized copying of the digital content. One such technology is Windows Media DRM by Microsoft Corporation. Other DRM techniques can additionally or alternatively be utilized.

The publication management component 214 may generally prescribe how and when a particular file will be published or presented. For example, the publication management module 214 for particular digital content may prescribe free access to a lower quality preview version of the digital content and purchased or licensed access to a higher quality version of the digital content. The publication management component 214 may also prescribe when a particular piece, of digital content on the central site system 100 will become publicly available—that is, for example, a release date of the digital content.

The distribution management component 216 may generally facilitate how a particular file will be distributed to the user 510. In this distribution, a variety of different parameters may be taken into consideration, including but not limited to, the size of the file and the bandwidth between the user 510 and central site system 100. In facilitating this task, a variety of different tools may be used.

The storage management component 218 may help manage the storage of various files. For example, the storage management component 218 may prescribe that video files are stored on a particular server and that picture or still images are stored on another server. The storage management component 218 may also recognize that a particular server is reaching its capacity and therefore, requests transfer of digital content to the next available server.

The publication management component 214, distribution management component 210, and storage management component 218 may also work together to facilitate communication with remote sites 300A, 300B, as will be described below with reference to the embodiment of FIG. 4.

The DAM back office module 220 communicates with the DAM application services module 140, utilizing, in some embodiments, the integration platform component 150. In such communication, a variety of adapters may be utilized, as will be recognized by one of ordinary skill in the art. The DAM back office module 220 in this embodiment may include a back-end system component 222, database services component 230, and content services component 240. The back-end system component 222 may include an enterprise resource planning and accounts receivable (ERP A/R) component 224, customer relations management (CRM) component 226, and a data warehouse (DW) component 228. The ERP A/R component 224 may be utilized for billing purposes. For, example, after a particular request is executed, information may be relayed to the ERP A/R module 234 to bill either the user 510 or a particular account for execution of the task. The data warehouse (DW) component 228 may be utilized to gather statistics on the usage of the central site system 100 to report, for example, to a system administrator. Examples of such statistics include, but are not limited to, identification of the number of times particular digital content has been downloaded and identification of the popularity of particular digital content in a particular geographical location. Any other statistical measurements may also be gathered. The customer relations management (CRM) component 226 may house a telephone call center or a frequently asked questions (FAQs) section for a website.

The database services component 230 stores the provider data database 234 and metadata database 232. The provider data database 234 may include data corresponding to user preferences, subscriptions, and the like. The metadata database 232 may include the manual and automatically retrieved metadata described above. The metadata database 232 may work closely with the search services component 138 to facilitate searching on the files in the central site system 100.

The content services component 240 may include a media object store component 242 that facilitates the hosting of digital content contained within the central site system 100.

In implementing the architecture of the embodiment of the central site system 100 of FIG. 1, a variety of server hardware (e.g., application servers, database servers, and content servers) networks (e.g., physical networks, and content delivery networks), and other hardware may be utilized. Additionally, in implementing the architecture of the central site system 100, a variety of different logic encoded in hardware, software, or a combination of both may be utilized. The architecture of the central site system 100 of FIG. 1 is not intended to be limited to any one configuration of hardware and/or software components, but rather intends to avail itself of any suitable hardware and/or software capable of facilitating operation of the central site system 100.

The enterprise system management module 250 is generally utilized for management of the remaining portion of the embodiment of the central site system 100 of FIG. 1. The enterprise system management module 250 in this embodiment includes a fault management component 252, a configuration management component 254, an account management component 256, a performance management component 258, a security management component 260, and a storage management component 262. The fault management component 252 defines what actions will occur if hardware and/or software in the central site system 100 fails. For example, if one server crashes, the fault management component 252 defines which server will take over the load, served by the crashed server.

The configuration management component 254 controls the configurations of several components on the central site system 100. For example, the configuration management component 254 may prescribe how the network is configured, how the databases operate, what platform (e.g., net, J2EE) is utilized when a user accesses the central site system 100, and the like.

The accounts management component 256 module may control management of accounts of users 510 including any subscriptions that may be associated therewith.

The performance management component 258 may be utilized for reporting statistics from the central site system 100, for example, from the data warehouse (DW) component 228. Examples of statistics include logging of transactions, CPU utilization, available bandwidth, and the like.

The security management component 260 may control the security associated with accessing various components of the system. The security management component 260 may facilitate the identification of a particular user 510 and encapsulate a profile of that user 510 through transactions. Such an operation may facilitate a single sign on (SSO) for the various components of the DAM application services 140 that will be accessed. The security management component 260 may also be responsible for the configuration, change management, and management of infrastructure (hardware, software) of the central site system 100 as it relates to security.

The storage management component 262 may manage the storage utilized in the infrastructure (hardware, software) of the central site system 100.

Modifications, additions, or omissions may be made to central site system 100 of FIG. 1 without departing from the scope of the invention. The components of the central site system 100 may be integrated or separated according to particular needs. Moreover, the operations of the central site system 100 may be performed by more, fewer, or other modules and/or components. Additionally, operations of the central site system 100 may be performed using any suitable logic comprising software, hardware, other logic devices, or any suitable combination of the preceding.

Figure 2:
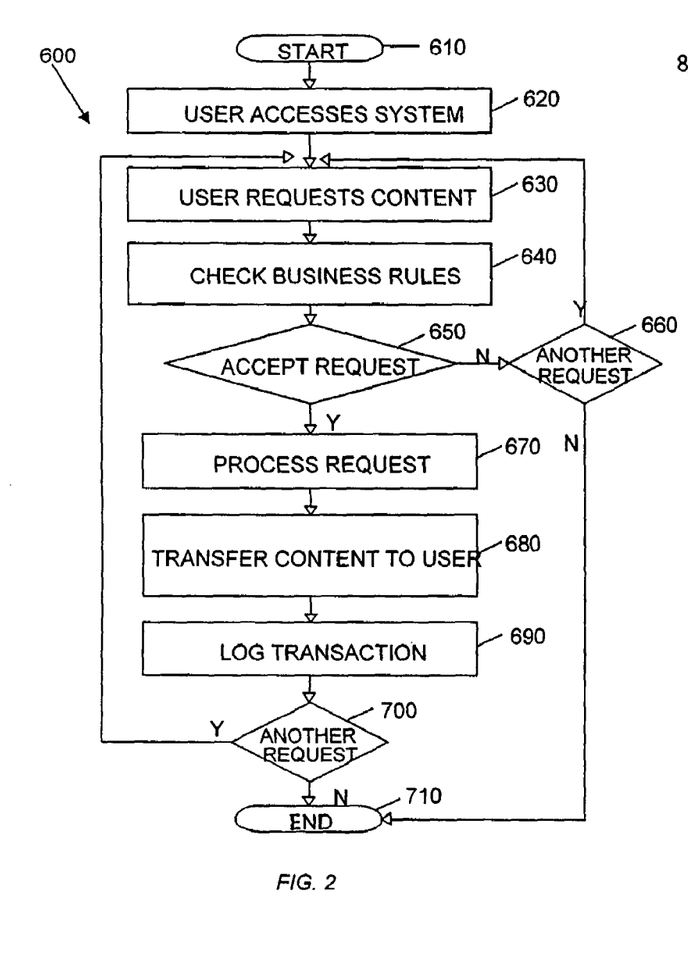
FIG. 2 is a flowchart associated with an example request of content from the central site system by a user.

FIG. 2 is a flowchart illustrating a series of example steps associated with a request of content from the central site system 100 by the user 510. In describing the flowchart of FIG. 2, reference will also be made to the components of FIG. 1. The process 600 begins at step 610. The user may access the central site system 100 at step 620 via logging on to and accessing information from the DAM portal module 130. The process of accessing the central site system 100 may include any of a variety of authentication schemes. Utilizing the DAM portal module, the user 510 may communicate with the DAM application services module 140 via the communication between the DAM portal module 130 and the DAM abstraction layer component 170.

The user makes a request for content at step 630. The request may be sent through the DAM abstraction layer component 170 to the DAM application services module 140. The request may be transferred to the content broker component 180. The content broker component 180 checks business rules associated with the particular request at step 640. As part of this review of business rules, the content broker component 180 may check a subscription of the user 510 to determine if the user 510 has subscribed to access for the digital content. According to the subscription, the request may either be accepted or rejected at step 650. If the request is rejected, the user 510 may be notified with a display message on the DAM Portal module 130 that the request was rejected and the associated reason for the rejection. At step 660, the user 510 may determine whether or not to make another request. If no other request is made, the user 510 may log out of the central site system 100 to the end the process 600 at step 710. If the user 510 makes another request, the user 510 loops back to step 630.

If the request is accepted, the request may be processed at step 670. The steps performed in such processing in some embodiments may be at least partially defined by the content broker component 180. In processing the request, the workflow management component 160 may be initiated to move the processing from one component to the next. In this processing, the integration platform component 150 may be utilized to facilitate communication amongst the components. Initial processing may begin by routing the request to the content services module 240 and the database services module 230 to gather data in a package. For example, the package may include the digital content, metadata and any other related data. The processing may continue by passing the package to the content manager services component 190.

At the content manager services component 190, the publication management component 214 and/or ingest process component 200 may facilitate the processing of any media type conversions or file type conversions that have been requested and mark the package for publication. The content rights management component 212 may then provide the appropriate digital rights management (DRM) to the package. The distribution management component 216 may then provide a routing mechanism to deliver the package to the user 510. Routing factors may include, but are not limited to, performance based routing as well as a preference of the user 510, if provided. The packaged digital content may then be placed in a queue for delivery, whereupon the digital content may be transferred to the user 510 at step 680.

Once the digital content is delivered to the user 510, the transaction may be logged at step 690 with the back-end system component 222 of the DAM back office module 220. The logging of the transaction may in turn be used for billing services with the enterprise resource planning and accounts receivable (ERP A/R) component 224 and statistical measurements with the data warehouse (DW) component 228.

The user 510, still logged on to the central site system 100 may make another request at step 700. If another request is made, the user 510 will be looped back to step 630. If no other request is made, the user 510 may log out of the system and end the process 600 at step 710.

Figure 3:
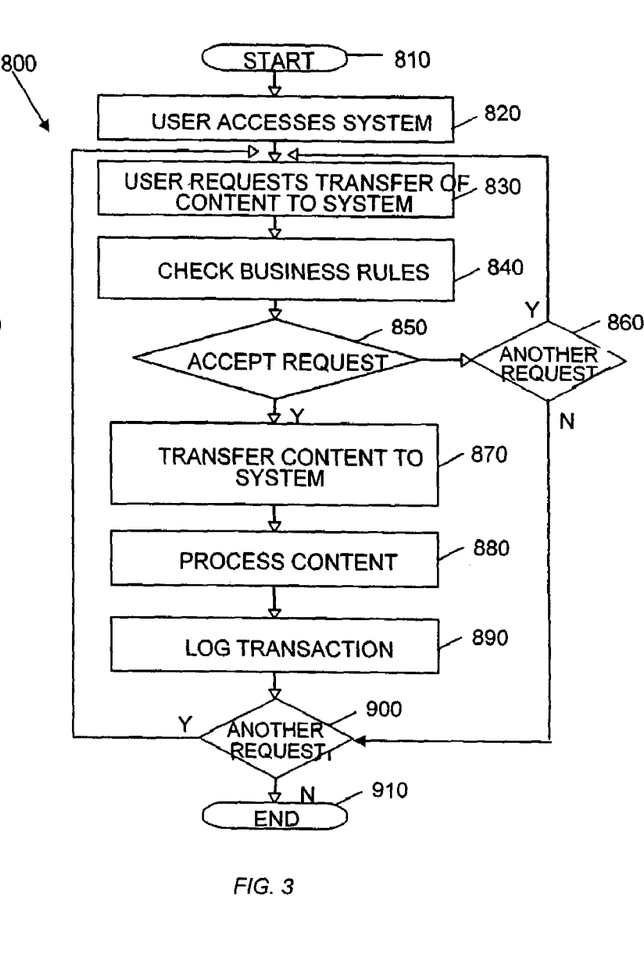
FIG. 3 is a flowchart associated with an example of uploading of content from a user to the central site system.

FIG. 3 is a flowchart illustrating a series of example steps associated with an uploading of content from the user 510 to the central site system 100. Similar to FIG. 2, in describing the flowchart of FIG. 3, reference will be made to the components of FIG. 1. The process 800 of uploading content may be similar to the content retrieval process 600 described above with reference to FIG. 2.

The process 800 begins at step 810. The user accesses the central site system 100 at step 820 via logging on to the web server 122 and accessing information from the DAM portal module 130. The process of accessing the central site system 100 may include any of a variety of authentication schemes. The user 510 may communicate with the DAM Application services module 140 via the DAM abstraction layer component 170.

The user 510 may request a transfer of content to the central site system 100 at step 830. The types of content that could being submitted are any of a variety of digital content and any of a variety of associated metadata. The request may be sent through the DAM abstraction layer component 170 to the DAM application services component 140. The request may then be transferred to the content broker component 180. The content broker component 180 checks business rules associated with the particular request at step 840. As part of this review of business rules, the content broker component 180 may check an upload subscription and/or authorization of the web user 510 to determine if the user 510 may upload the particular content requested. Additionally, the business rules may also prescribe that if an upload is authorized, what type of format the uploaded digital content should be stored in. According to the subscription and/or authorization, the request may either be accepted or rejected at step 850. If the request is rejected, the user 510 may determine whether or not to make another request at a step 860. If no other request is made, the user 510 may log out of the central site system 100 to end the process 800 at step 910. If the user 510 makes another request, the user 510 loops back to step 830.

If the request is accepted, the digital content may be transferred to the central site system 100 at step 870 and processed at step 880. The steps performed in such processing in some embodiments may be at least partially defined by the content broker component 180. In processing the request, the workflow management component 160 is initiated to move the processing from one component to the next. In this processing, the integration platform component 150 may be utilized to facilitate communication amongst the components. As part of the processing at step 880, the content may initially be sent to the ingest process component 200 for processing by the digitization component 202, encoding component 204, and/or metadata generator component 206. As part of the content processing with the metadata generator component 206, the metadata generation may be an automated process. Additionally, the metadata may be manually edited via an application interface. For example, a web form may be sent back to the DAM portal module 130 through the DAM abstraction layer component 170 to be served up to the user 510 by the portal server 132.

After processing at the ingest processing component 200, the process 800 may continue by transferring the package to the content manager component 210. At the content manager component, the package may be processed by the content rights management component 212, the publication management component 214, the distribution management component 216, and the storage management component 218 and transferred to content services 240 according to specifications prescribed by the user 510. For example, the user 510 may have requested that a certain uploaded file only be designated for a draft version and not to be published for others to view, yet.

The user 510, still logged into the central site system 100, may make another request at step 900. If another request is made is made, the user 510 will be looped back to step 630. If no other request is made, the user 510 may log out of the central site system 100 and end the process 800 at step 910.

Figure 4:
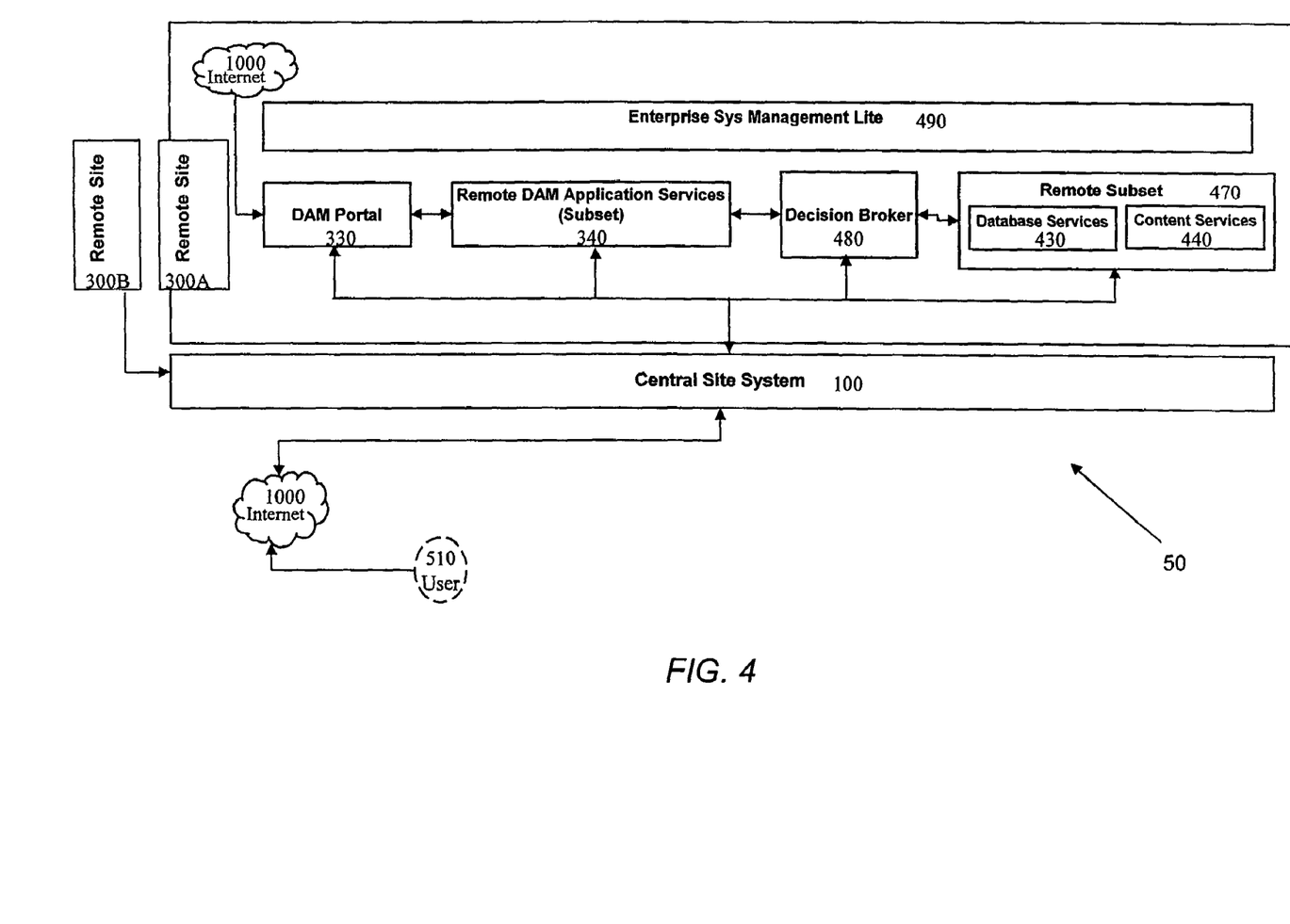
FIG. 4 is an example of another architecture of a system that can be utilized, according to another embodiment of the invention.

FIG. 4 is an illustrative example of another architecture of a system 50 that may be utilized, according to another embodiment of the invention. The system 50 in this embodiment includes remote sites 300A, 300B in communication with a central site system 100. For purposes of brevity, only one remote site 300A is shown in detail. Although two remote sites 300A, 300B are shown in this embodiment of the system 50, other embodiments of the system 50 may include only one remote site or more than two remote sites.

In transferring digital content from a site to a user or the user to a site, difficulties may arise due to a variety of reasons including, but not limited to, the size of the digital content, the geographic location of the user and the site, the system resources (e.g., bandwidth) available between the user and site, other system based reasons, or combinations of the preceding. Accordingly, in some embodiments the system 50 may facilitate an alleviation of some of these difficulties. In other embodiments, the system 50 may facilitate a particular digital content distribution model. In yet other embodiments, other uses can be made of the system 50. Several illustrative examples of uses of embodiments of the system 50 are described below.

Any suitable communication links may be utilized between the user 510 and the central site system 100; the user 510 and either of the remote sites 300A, 300B; and the remote site 300A and the remote site 300B. Examples include, but are not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

The remote sites 300A, 300B in some embodiments may generally include a subset of components and/or digital content of the central site system 100. In other embodiments, the remote sites 300A, 300B may include different, more, or less components and/or digital content than the central site system 100. The remote site 300A shown in FIG. 4 generally contains a DAM portal module 330, a remote DAM application services module 340, a decision broker module 480, and a remote subset module 470. The DAM portal module 330 may be substantially similar to the DAM portal module 130 of FIG. 1.

The remote DAM application services module 340 may contain a variety of different component parts that exist in the DAM application services module 140 of the embodiment of the central site system 100 of FIG. 1. As an example, intended for illustrative purposes only, the remote DAM application services module 340 may contain a publication management component 214, a distribution management component 216, and a storage management component 218. Similarly, the remote subset component 470 may contain a database service component 430 that is a subset of the database service component 230 of FIG. 1, a content service component 440 that is a subset of content services component 240 of FIG. 1, and an enterprise system management lite module 490 that is a subset of the enterprises system management module 250 of FIG. 1.

The remote site 300A in some embodiments may be viewed as a branch library of the central site system 100 of FIG. 1. The central site system 100 contains digital content in a media object store 242 and the remote site 300A contains a partial listing or subset of the digital content in the media object store 242—e.g., in the content services 440. This subset of the digital content at the remote site 300A may be selected, according to various parameters, for example, the usage or popularity of digital content, the size of digital content, the type of the digital content, the geographic location of the remote site 300A, other parameters, or combinations of the preceding.

When the user 510 requests digital content from a remote site 300A, the decision broker module 480 searches within the remote site 300A to determine if the content services component 440 of the remote site 300A contains the digital content. If the remote site 300A does not contain the digital content, the decision broker module 480 may query the central site system 100 (or other remote sites—e.g., remote site 300B) for the digital content. Querying of the central site system 100 may include, but is not limited to, inquiring as to which sites in the system 50 (e.g., the central site system 100 or the remote site 300B) have the content, and inquiring as to the most recent version of the digital content.

Assuming that more than one site has the digital content, the decision broker module 480 may decide to obtain the digital content from one of the sites. Parameters utilized by the decision broker module 480 in making such as decision include but are not limited to, available bandwidth between the remote site 300A and the central site system 100, available bandwidth between the remote site 300B and the remote site 300A, a geographic location of the remote site system 300B and the central site system 100 in proximity to a geographic location of the remote site 300A, a size of the digital content, a type of the digital content, other parameters, and combinations of the preceding. In other embodiments, the remote site 300A may choose to obtain the digital content from more than one site by obtaining a segment of the digital content from each of the sites. Upon receipt of each of the segments from the sites, the remote site 300A can reassemble the segments to form the digital content. In such embodiments, similar parameters may be considered in determining which site and how many sites, if any, to receive the digital content from. Further details of such an embodiment will be described below with reference to FIG. 5.

After the decision broker 480 has decided upon a particular site and/or sites, the digital content may be transferred from the site(s) (e.g., remote site 300B and/or the central site system 100) to the remote site 300A, whereupon the digital content is added to storage at the remote site 300A. Then, the digital content may be delivered to the user 510 from the remote site 300A.

Based on a variety of parameters, the digital content may be temporarily stored at the remote site 300A for access by other users. Decisions pertaining to the duration of retention of the digital content may be based upon a variety of parameters including, but not limited to, a usage of the digital content, a version of the digital content, information received from another site (described in more detail below), a length of time the digital content has been stored at the remote site 300A, geographic location of the remote site 300A, geographic location of another site (e.g., the central site system 100 and/or remote site 300B), a size of the digital content, a type of digital content, other parameters, and combinations of the preceding.

If and when the digital content is delivered to the remote site 300A, be it from the remote site 300B or the central site system 100, information may be relayed back to the central site system 100, indicating that the remote site 300A has just been delivered particular digital content and has retained such content for future access. Such information allows the central site system 100 to relay information, concerning the particular digital content to other remotes sites (e.g., remote site 300B). Such information would be useful when the central site system 100 (or other remote site—e.g., remote site 300B) is queried as to the location of particular digital content. For example, a third remote site may seek the digital content just received at remote site 300A. Information stored at the central site system 100 may include, but is not limited to, the version of the digital content and when the digital content was delivered to the remote site 300A.

Other information may additionally be shared between the remote sites 300A, 300B, and the central site system 100. For example, the remote site 300A can relay information to the DAM Back Office 220 of the central site system 100 for logging of transactions. The logging of transactions may utilized for billing purposes and determinations of usage of digital content, for example, to determine what content is popular in a particular geographical area. Yet other information can be shared as will be recognized by one of ordinary skill in the art after review of the specification herein.

The remote site 300A may determine based upon the variety of parameters referenced above and/or or other parameters that particular digital content should no longer be stored. As part of this decision process, the remote site 300A may receive input from the central site system 100. For example, the central site system 100 may determine, based upon usage patterns that the remote site 300A should maintain digital content. For example, central site system 100 may utilize remote site 300A as a hub for delivery to other remote sites (e.g., remote site 300B). After deletion of particular digital content from the remote site 300A, the remote site 300A may communicate information back to the central site system 100 that the particular digital content has been deleted.

While querying of availability of digital content is generally described with reference to the central site system 100, in other embodiments, querying of availability of digital content may be done at the remote sites. For example, remote site 300A may directly query remote site 300B for particular digital content.

Similar to the process of downloading digital content from a remote site 300A, digital content may additionally be uploaded to a remote site 300A for either storage at the remote site 300A and/or storage at the central site system 100. In this process, the decision broker 480 may communicate with the central site system 100 to determine whether the digital content needs to be transferred to the central site system 100, stored at the remote site 300A, or both. In some embodiments, the connection between the central site 100 and the remote site 300A may have more resources (e.g., bandwidth) than the connection between the user 510 and the central site system 100. Accordingly, remote site 300A in some embodiments may serve as staging point to transfer digital content to the central site system 100. In other embodiments of the central site system 50, certain component parts and/or modules may only be stored at the central site system 100. For example, the content rights management module 212 may only be located at the central site system 100. Accordingly, the user 510 can upload digital content to the remote site 300A, which is then transferred by the remote site 300A to the central site system 100 for processing by the content rights management module 212.

Similar to FIG. 1, modifications, additions, or omissions may be made to the system 50 of FIG. 4 without departing from the scope of the invention. The components of the system 50 may be integrated or separated according to particular needs. Moreover, the operations of the system 50 may be performed by more, fewer, or other modules and/or components. Further, a variety of other system distribution techniques may be utilized. Additionally, operations of the system 50 may be performed using any suitable logic comprising software, hardware, other logic devices, or any suitable combination of the preceding.

Figure 5:
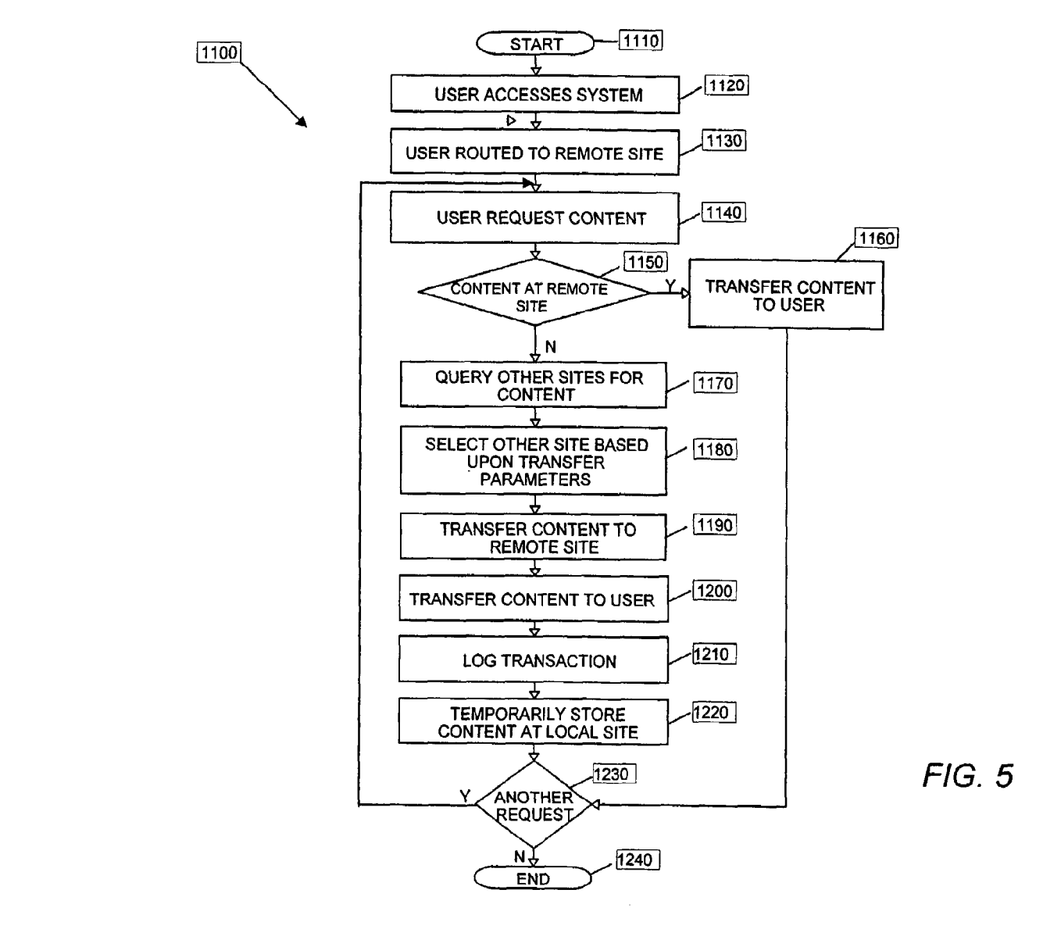
FIG. 5 is a flowchart associated with an example of a user requesting content from a remote site.

FIG. 5 is a flowchart illustrating a series of example steps associated with the user 510 requesting content from a remote site 300A. In describing the flowchart of FIG. 5, reference will additionally be made to the components of the system 50 of FIG. 4. The process 1100 begins at step 1110. The user 510 accesses the system 50 at step 1120. In accessing the system 50, the user 510 could either initially be accessing the remote site 300A, remote site 300B or the central site system 100. Regardless of whether the user is accessing the remote site 300A, 300B, or the central site system 100, the user 510 may be routed to the remote site 300A. Such a routing may be based on a variety of parameters, for example the geographical location of the user 510 and the available system resources (e.g., bandwidth) between the user 510 and the remote site 300A. The user 510 in accessing the system 50 may either be authenticated with the central site system 100 or be authenticated with the remote sites 300A, 300B to access content.

The user 510 requests content from the remote site 300A at step 1140. With this request, the remote site 300A may begin processing the request in a manner similar to step 640 and step 650 of FIG. 2. Assuming that the user 510 has been authorized to access particular digital content, the decision broker module 480 checks the remote site 300A for the digital content at step 1150. If the digital content is available at the remote site 300A, the digital content may be transferred to the user 510 at step 1160. If the digital content is unavailable at the remote site 300A, the decision broker 480 may query other sites for the digital content at step 1170. The querying of other sites may include, but is not limited, querying other remotes sites (e.g., remote site 300B) or the central site system 100.

As an example, intended for illustrative purposes only, the remote site 300 may query the central site system 100. The central site system 100 may store or maintain information on what digital content the central site system 100 contains as well as the digital content that other remote sites (e.g., remote site 300B) contain. Based on this information and other system parameters, the remote site 300 at step 1170 may select which site and/or sites to receive the content from. The system parameters may include, but are not limited to, available bandwidth between the remote site 300A and the central site system 100, available bandwidth between the remote site 300B and the remote site 300A, a geographic location of the remote site system 300B and the central site system 100 in proximity to a geographic location of the remote site 300A, a size of the digital content, a type of the digital content, other parameters, and combinations of the preceding.

The content may be transferred to the remote site 300A at step 1190. In some embodiments, the digital content may be obtained from more than one site. In deciding to receive the digital content from more than one site, the decision broker 480 could consider parameters similar to those described above as well as other parameters. In such embodiments, the remote site 300A may receive segmented portions of the content from each site (e.g., remote site 300B and central site system 100) and reassemble the segmented content at the remote site 300A. A variety of techniques for segmenting and reassembling files will be recognized by one of ordinary skill in the art.

After the content is received at the remote site 300A, the content may be transferred to the user 510 at step 1200. In this transfer to the user 510 and depending upon the parameters of the system 50, the content may be transferred to the user 510 from more than one site (e.g., 300A, 300B) in a manner similar to the segmented transfer to the remote site 300A, described above.

After the content is transferred to the user 510, the transaction may be logged at step 1210. The logging of the transaction at step 1210 may be used for billing purposes and for gathering of statistical information on system usage.

Temporary storage of the digital content at the remote site 300A may begin at step 1220. The duration of storage of the digital content at the remote site 300A may be based on a variety of different parameters including, but not limited to, a usage of the digital content, a version of the digital content, information received from another site (e.g., central site system 100 or remote site 300B), a length of time the digital content has been stored at the remote site 300A, a geographic location of the remote site 300A, a geographic location of another site (e.g., the central site system 100 and/or remote site 300B), a size of the digital content, a type of digital content, other parameters, and combinations of the preceding.

The user 510, after receiving the digital content, may make another request for content at step 1230. If a request is made, the user 510 is routed back up to step 1140. If no request is made, the user may log out of the system and end the process at step 1240.

Figure 6:
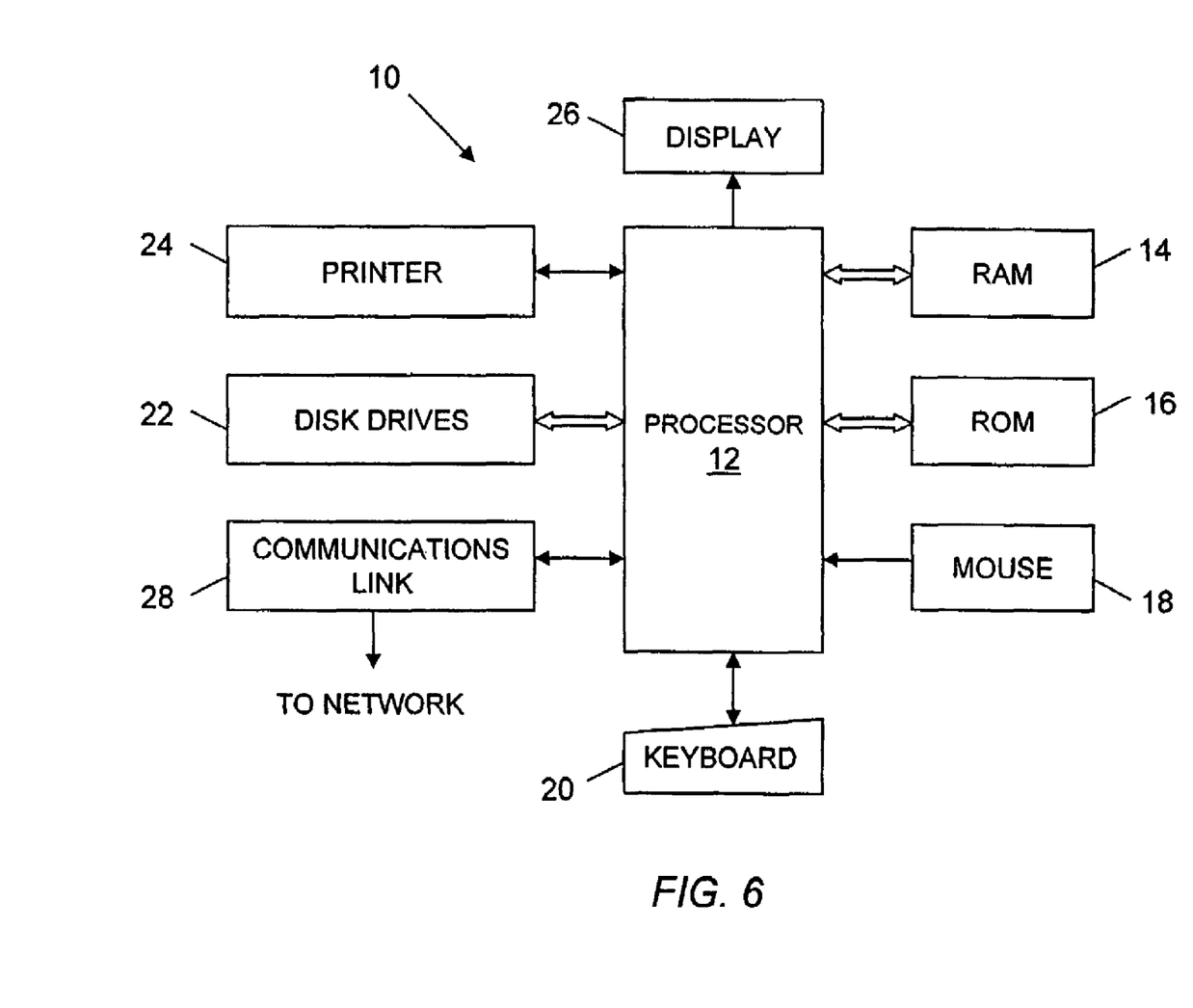
FIG. 6 is an embodiment of a general purpose computer that may be used by other embodiments of the invention.

FIG. 6 is an embodiment of a general purpose computer 10 that may be used in connection with one or more pieces of software employed by other embodiments of the invention. General purpose computer 10 may generally be adapted to execute any of the well-known OS2, UNIX, Mac-OS, Linux, and Windows Operating Systems or other operating systems. The general purpose computer 10 in this embodiment comprises a processor 12, a random access memory (RAM) 14, a read only memory (ROM) 16, a mouse 18, a keyboard 20 and input/output devices such as a printer 24, disk drives 22, a display 26 and a communications link 28. In other embodiments, the general purpose computer 10 may include more, less, or other component parts. Embodiments of the present invention may include programs that may be stored in the RAM 14, the ROM 16 or the disk drives 22 and may be executed by the processor 12. The communications link 28 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 22 may include a variety of types of storage media such as, for example, floppy disk drives, hard disk drives, CD ROM drives, DVD ROM drives, magnetic tape drives or other suitable storage media. Although this embodiment employs a plurality of disk drives 22, a single disk drive 22 may be used without departing from the scope of the invention.

Although FIG. 6 provides one embodiment of a computer that may be used with other embodiments of the invention, such other embodiments may additionally utilize computers other than general purpose computers as well as general purpose computers without conventional operating systems. Additionally, embodiments of the invention may also employ multiple general purpose computers 10 or other computers networked together in a computer network. Most commonly, multiple general purpose computers 10 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 6, the logic comprises computer software executable on the general purpose computer 10. The medium may include the RAM 14, the ROM 16 or the disk drives 22. In other embodiments, the logic may be contained within hardware configuration or a combination of software and hardware configurations. The logic may also be embedded within any other suitable medium without departing from the scope of the invention.

The central site system 100 of FIG. 1 and system 50 of FIG. 4 may be utilized in a virtual unlimited number of settings. For example, in some embodiments, a news organization or a film studio could deliver a particular request piece of digital audio or video footage to a remote studio or affiliate. The remote studio, could in turn deliver the digital footage to another remote studio or affiliate utilizing the system 50 of FIG. 4.

As another example, a software company could utilize the central site system 100 and system 50 to roll-out a new release of software, downloadable by a variety of users at different remote sites 300A, 300B. In such a roll-out, the storage at a remote site 300A, 300B could be based upon popularity in a particular geographical area.

As another example, an on-demand digital movie rental services could be established with the central site system 100 maintaining copies of entire libraries of digital videos and the remote sites 300A, 300B containing the more popular digital videos. A digital music delivery service could be established in a similar manner.

As yet a further example, digital movies could be rolled-out to movie theaters. A variety of other uses could additionally be utilized for delivery of documents, e-books, pictures, or the like.

Numerous other changes, substitutions, variations, alterations, and modifications may be ascertained to one skilled in the art and it is intended that the present invention encompass all such changes, substitutions, variations, alterations, and modifications as falling within the scope of the appended claims.

To aid the Patent Office, and any readers of any patent issued on this application in interpreting the claims appended hereto, applicants wish to note that they do not intend any of the appended claims to invoke ¶6 of 35 U.S.C. § 112 as this paragraph and section exists on the date of filing hereof unless "means for" or "step for" are used in the particular claim.

What is claimed is:

1. A method for providing digital content, the method comprising:

receiving a request from a user for digital content at a remote site;

applying, at the remote site, a set of business rules to the request to determine further processing based upon the request, wherein the applying a set of business rules to the request to determine further processing based upon the request further comprises:

passing at least one of the business rules to the other site; and applying the at least one of the business rules at the other site;

applying a set of personalization rules to the request to determine further processing based upon the request, the set of personalization rules being defined by the user, the personalization rules providing general user preferences that are not specific to the request;

wherein the set of personalization rules define a preferred digital content format, the method further comprising converting the digital content to the preferred digital content format;

searching a first digital content library at the remote site for the digital content, if the digital content is unavailable at the remote site, applying, at another site, the set of business rules to the request to determine further processing based upon the request, and searching at least a second digital content library located at the other site for the digital content;

if the content is available at the other site, requesting transfer of the digital content from the other site to the remote site;

receiving the digital content from the other site;

transferring the digital content to the user from the remote site; and using a computer system, temporarily storing the digital content at the remote site such that the content may be accessed by other users.

2. The method of claim 1, wherein
the other site is a central site system,
the central site system contains a set of digital content, and the remote site contains a subset of the set of digital content.

3. The method of claim 1, further comprising:
transferring information to a central site system after initiation of temporarily storing the digital content, wherein
the information indicates that the remote site is temporarily storing the digital content.

4. The method of claim 1, wherein the other site is a second remote site, and the searching the other site for the digital content comprises:
searching a central site system, the central site system, having information as to the digital content available at the second remote site.

5. The method of claim 1, wherein the other site comprises a plurality of sites, further comprising:
if the content is available at more than one of the plurality of sites, selecting one of the plurality of sites to transfer the digital content.

6. The method of claim 5, wherein selecting one of the plurality of sites to transfer the digital content is based upon a parameter selected from the group consisting of available bandwidth between the remote site and each of the more than one of the plurality of sites, a geographic location of each of the more than one of the plurality of sites, a geographic location of the remote site, a size of the digital content, a type of digital content, and combinations thereof.

7. The method of claim 1, wherein the other site comprises a plurality of sites, further comprising:
if the content is available at more than one of the plurality of sites, requesting transfer from more than one of the plurality of sites;
receiving segments of the digital content from each of the more than one of the plurality of sites; and
reassembling the segments to form the digital content at the remote site.

8. The method of claim 1, wherein a duration of temporary storage of the digital content is based upon a parameter selected from the group consisting of usage of the digital content, version of the digital content, information received from another site, a length of time the digital content has been stored at the remote site, geographic location of the remote site, geographic location of another site, a size of the digital content, a type of digital content, and combinations thereof.

9. A system comprising:
logic encoded in a computer storage, media such that when executed is operable to:
receive a request from a user for digital content at a remote site
apply a set of business rules to the request to determine further processing based upon the request,
wherein the applying a set of business rules to the request to determine further processing based upon the request further comprises:
passing at least one of the business rules to the other site; and
applying the at least one of the business rules at the other site;
applying a set of personalization rules to the request to determine further processing based upon the request, the set of personalization rules being defined by the user, the personalization rules providing general user preferences that are not specific to the request;
wherein the set of personalization rules define a preferred digital content format, the method further comprising converting the digital content to the preferred digital content format;
search a first digital content library at the remote site for the digital content;
if the digital content is unavailable at the remote site, apply, at another site, the set of business rules to the request to determine further processing based upon the request, and search at least a second digital content library located the other site for the digital content;
if the content is available at the other site, request transfer of the digital content from the other site to the remote site;
receive the digital content from the other site;
transfer the digital content to the user from the remote site; and
temporarily store the digital content at the remote site such that the content may be accessed by other users.

10. The system of claim 9, wherein
the other site is a central site system,
the central site system contains a set of digital content, and
the remote site contains a subset of the set of digital content.

11. The system of claim 9, wherein the logic is further operable to:
transfer information to a central site system after initiation of temporarily storing the digital content, wherein
the information indicates that the remote site is temporarily storing the digital content.

12. The system of claim 9, wherein the other site is a second remote site, and the logic in the search of the other site for the digital content searches a central site system, the central site system having information as to the digital content available at the second remote site.

13. The system of claim 9, wherein the other site comprises a plurality of sites and the logic is further operable to:
if the content is available at more than one of the plurality of sites, select one of the plurality of sites to transfer the digital content.

14. The system of claim 13, wherein the logic in the selection of one of the plurality of sites to transfer the digital content utilizes a parameter selected from the group consisting of available bandwidth between the remote site and each of the more than one of the plurality of sites, a geographic location of each of the more than one of the plurality of sites, a geographic location of the remote site, a size of the digital content, a type of digital content, and combinations thereof.

15. The system of claim 9, wherein the other site comprises a plurality of sites, the logic further operable to:
if the content is available at more than one of the plurality of sites, request transfer from more than one of the plurality of sites;
receive segments of the digital content from each of the more than one of the plurality of sites; and
reassemble the segments to form the digital content at the remote site.

16. The system of claim 9, wherein the logic in the temporary storage of the digital content determines a duration utilizing a parameter selected from the group consisting of usage of the digital content, version of the digital content, information received from another site, a length of time the digital content has been stored at the remote site, geographic location of the remote site, geographic location of another site, a size of the digital content, a type of digital content, and combinations thereof.

17. The method of claim 1, further comprising:

converting the digital content from one format to another format.

18. The system of claim 9, wherein the logic is further operable to:

convert the digital content from one format to another format.

19. The method of claim 1, wherein the temporarily storing the digital content at the remote site such that the content may be accessed by other users further comprises temporarily storing the digital content at the remote site based on parameters chosen from the group consisting of: a usage of digital content, a version of the digital content, information received from another site, a length of time the digital content has been stored are the remote site, geographic location of another site, a size of the digital content, and a type of the digital content.

20. The method of claim 1, wherein the applying a set of business rules to the request to determine further processing based upon the request further comprises determining the amount and type of content a particular user may access based upon authorization.

21. The method of claim 1, wherein the remote site and the other site are members of a central site system, the method further comprising:

receiving, from a publisher, a request to upload digital content to the central site system; and uploading the digital content to a member of the central site system in response to the request.

22. The method of claim 1, further comprising obtaining reporting performance statistics from the remote site and the other site, the reporting performance statistics monitoring statistics chosen from the group consisting of: logging of transactions, CPU utilization, and available bandwidth.

23. The method of claim 1, the other site logging transactions for purposes of billing the user.

24. The method of claim 1, the other site logging transactions for purposes of determining popularity of the digital content.

25. The method of claim 1, further comprising receiving sign-on credentials at the remote site from the user, the sign-on credentials enabling user access to the remote site and to the other site.

* * * * *

UNITED STATES PATENT AND TRADEMARK OFFICE
CERTIFICATE OF CORRECTION

| | | |
|---|---|---|
| PATENT NO. | : 7,613,704 B2 | Page 1 of 1 |
| APPLICATION NO. | : 11/039389 | |
| DATED | : November 3, 2009 | |
| INVENTOR(S) | : Sanjay P. Lobo | |

It is certified that error appears in the above-identified patent and that said Letters Patent is hereby corrected as shown below:

In column 18, line 11, in Claim 9, delete "located the" and insert -- located at the --, therefor.

Signed and Sealed this

Sixteenth Day of February, 2010

David J. Kappos
*Director of the United States Patent and Trademark Office*